Patented Oct. 18, 1949

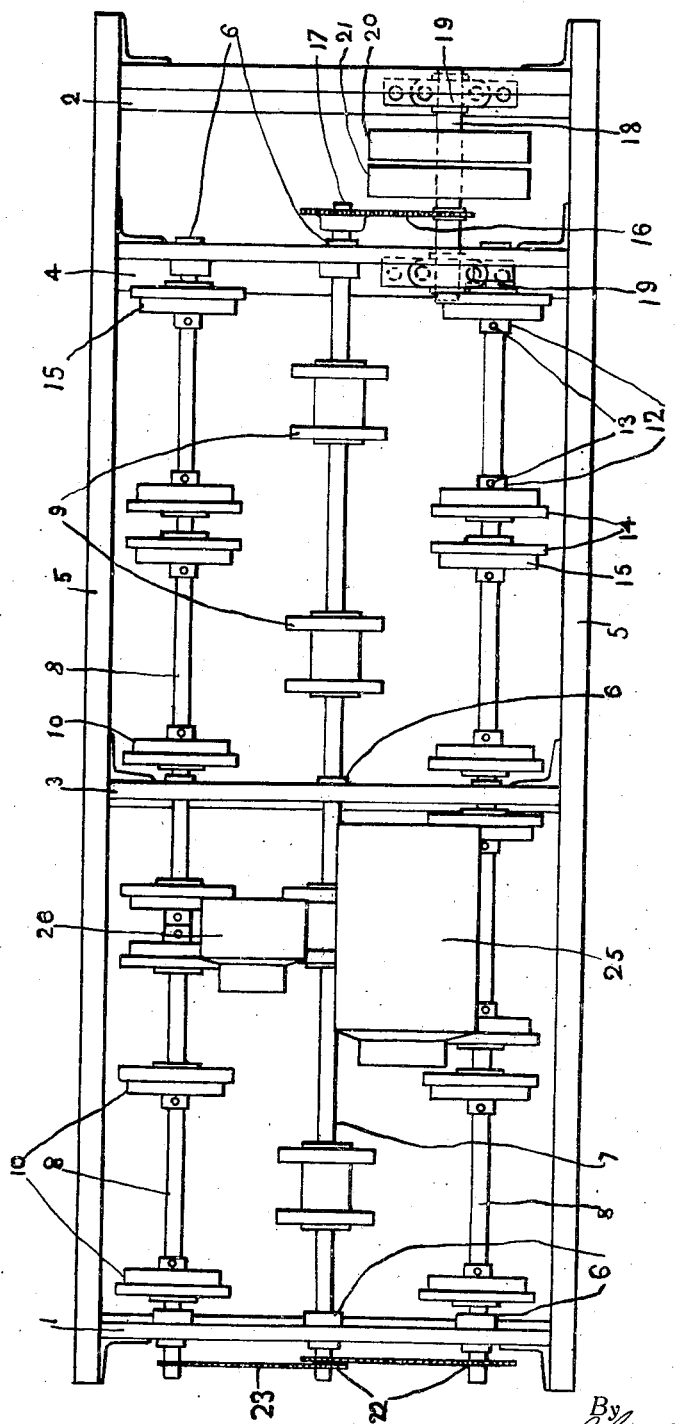

2,484,873

UNITED STATES PATENT OFFICE 2,484,873

ROLLER SUPPORT FOR BALL MILLS

Ernest Henry Brant, London, England, assignor to Celanese Corporation of America, a corporation of Delaware Application November 6, 1946, Serial No. 708,014
In Great Britain November 16, 1945

1 Claim. (Cl. 241—178)

This invention relates to grinding or pulverising, and particularly to ball mill grinding and to apparatus therefor, in which the material to be ground is placed in a closed vessel with a quantity of pebbles or balls of relatively hard material, and the vessel is rotated so that the material is ground by the rolling and tumbling action of the balls.

A common arrangement in grinding mills of this kind, and especially in small mills in which the capacity of the vessel is of the order of a few gallons, comprises a rectangular rotatable frame mounted in trunnion bearings or in a single bearing from which the frame overhangs, and provided with driving means and with clamps for securing in the frame a cylindrical vessel containing the charge of balls and material to be ground. This arrangement has a number of disadvantages. It is not well adapted for the handling of vessels of different capacities since the clamps require elaborate packing in order to hold a pot of small diameter, it occupies a considerable amount of floor space for each vessel accommodated thereby and the clamping and unclamping of the vessel within the rectangular frame wastes time. It is an object of the present invention to provide an apparatus for ball mill grinding that is free from these disadvantages.

According to the present invention a ball mill rack for receiving and rotating cylindrical vessels, for example earthenware or glass bottles, for the purpose of ball mill grinding comprises a pair of parallel shafts, means for driving said shafts, and a pair of friction wheels on each shaft, said friction wheels being adapted to co-operate to support and to rotate by friction a cylindrical vessel resting upon them with its axis parallel to said shafts. The friction wheels on one of the shafts may conveniently be flanged to engage the ends of the bottle and position it longitudinally, the wheels being spaced apart at an appropriate distance. The wheels on the other shaft are preferably plain and are set closer together than the flanged wheels. The flanged wheels, and also if desired the plain wheels on the other shaft, are preferably adjustable along the length of the shaft on which they are carried so as to accommodate bottles of any desired length. Each shaft may carry a plurality of pairs of friction wheels so as to support and drive simultaneously a plurality of cylindrical vessels arranged end to end.

The ball mill rack in accordance with the invention, instead of accommodating a single bottle or row of bottles placed end to end, may be made to accommodate a plurality of rows by the addition of one or more additional shafts parallel to the first two, each additional row of bottles requiring a further shaft. Three shafts is a convenient number, accommodating two rows of bottles, the friction wheels on the outer shafts being flanged while the friction wheels on the inner shaft are plain. The drive to the shafts may be applied to the two outer shafts, to the middle shaft only, or to all three shafts.

The ball mill rack according to the invention is simple in construction and operation. It can accommodate bottles or other cylindrical vessels of a wide range of diameters without adjustment and of a wide range of lengths by an adjustment of the simplest character. Since the rack may be designed to accommodate several bottles simultaneously, the floor space occupied by each bottle is relatively low. The time occupied in mounting a bottle on the rack is very short, especially if the flanged wheels are already appropriated adjusted. Moreover, in the latter case, it is not necessary to stop the drive to the rack in order to remove or replace a bottle thereon.

By way of example one form of ball mill rack in accordance with the present invention will now be described in greater detail with reference to the accompanying drawing, which is a plan view of the rack with two bottles mounted thereon.

The rack comprises a low frame, about eighteen inches high, in the form of two rectangular end frames 1, 2, two intermediate frames 3, 4, and four longitudinal members 5 connecting the frames. In bearings 6 just below the upper faces of the end and intermediate frames 1—4, three parallel horizontal shafts 7, 8 are accommodated, each shaft carrying four pairs of friction wheels 9, 10, two pairs on each side of the intermediate frame 3. The wheels 9 on the middle shaft 7 are in the form of integral pairs, fixed to the shaft 7. Each of the wheels 10 on the outer shafts 8, however, is separate and is mounted on a hub 12 slidable along the length of its shaft 8 and secured to the shaft by means of a set screw 13 passing radially through the hub 12 and engaging a flat formed on the surface of the shaft 8. The wheels 9 on the middle shaft 7 are in the form of plain discs but the wheels 10 on the outer shafts 8 are provided with narrow flanges 14, about ½-inch in width extending beyond the main driving surface 15 round the periphery of the wheel. The flange 14 on each friction wheel 10 is on the side opposite to the other friction wheel 10 of the same pair.

The middle shaft 7 carrying the plain disc wheels 9 is driven by a chain 16 and sprockets 17 from a counter shaft 18 carried in bearings 19 low down between the frames 2, 4. The counter shaft 18 carries fast and loose pulleys 20, 21, adapted to work in conjunction with suitable belt-shifting gear. At the opposite end of the rack to the fast and loose pulleys 21, 22 the two outer shafts 8 are connected to the middle shaft 7 by means of sprockets 22 and chains 23.

The rack is thus adapted to accommodate eight cylindrical vessels or bottles simultaneously, which may be of any diameter up to the distance between the middle and the outer shafts 7, 8, and of any length up to half the distance between the end and intermediate frames 1, 3, or even longer provided that a shorter bottle be used on the adjacent set of wheels. A large bottle 25 and a small bottle 26 are shown in position on the rack. In the course of ordinary use the friction wheels 10 are permanently set in position and only require adjustment when a bottle of different size from that previously employed is to be used.

Having described my invention, what I desire to secure by Letters Patent is:

A ball mill rack for receiving and rotating cylindrical vessels for the purpose of ball mill grinding, said rack comprising three parallel shafts in substantially the same plane, means for driving said shafts in the same direction, an equal number of pairs of friction wheels on each shaft, and, on each of the friction wheels on the two outer shafts, a flange extending radially from that face of said wheel remote from the other wheel of the same pair, the pairs of friction wheels on the middle shaft being plain and being spaced closer together than the corresponding pairs of wheels on either of the outer shafts and being intermediate thereof, said friction wheels being adapted to co-operate, to support and rotate by friction two parallel rows of cylindrical vessels each resting upon a pair of friction wheels on an outer shaft and a pair of friction wheels on the inner shaft, and with its ends located by said flanges, said flanged wheels being adjustable along the length of the shafts on which they are carried so as to accommodate vessels of different lengths.

ERNEST HENRY BRANT.

REFERENCES CITED

The following references are of record in the file of this patent:

UNITED STATES PATENTS

| Number | Name | Date |
|---|---|---|
| 178,564 | Smith | June 13, 1876 |
| 860,404 | Moussette | July 16, 1907 |
| 1,536,491 | Gunderoth | May 5, 1925 |
| 1,940,492 | Gale | Dec. 19, 1933 |
| 2,078,829 | Barratt | Apr. 27, 1937 |
| 2,212,452 | Pereny | Aug. 20, 1940 |
| 2,248,490 | Chamberlain et al. | July 8, 1941 |

Certificate of Correction

October 18, 1949

Patent No. 2,484,873

ERNEST HENRY BRANT

It is hereby certified that errors appear in the printed specification of the above numbered patent requiring correction as follows:

Column 2, line 20, for the word "appropriated" read *appropriately*; column 3, line 7, for "pulleys 21, 22" read *pulleys 20, 21*;

and that the said Letters Patent should be read with these corrections therein that the same may conform to the record of the case in the Patent Office.

Signed and sealed this 4th day of April, A. D. 1950.

[SEAL]

THOMAS F. MURPHY,
*Assistant Commissioner of Patents.*